Patented Oct. 15, 1929

1,732,026

UNITED STATES PATENT OFFICE

JACOB POHLMANN AND JACOBUS RENARDUS FREDERIK RASSERS, OF LEIDEN, NETHERLANDS

PROCESS FOR THE PREPARATION OF MILK, SKIMMED MILK, OR BUTTERMILK FREE OF MILK SUGAR

No Drawing. Application filed November 10, 1928, Serial No. 318,580, and in the Netherlands August 26, 1927.

The preparations which are sold as "sugar-free" milk do not comply with this designation. They are either not free from milk-sugar or they are not milk.

The object of the invention is to prepare a class of milk which corresponds to ordinary milk as regards its chemical composition and its physical properties, and does not contain lactose.

The difficulty encountered in the attempts to remove the lactose from the milk, is caused particularly by the impossibility of separating the lactose from the casein and albumen without denaturing these materials to such an extent that they cannot again be brought back to the original state in which they occur in the milk.

The applicants achieved their object by means of two steps:—firstly they took care in precipitating the casein, to denature this as little as possible, and secondly, in order to bring the precipitated casein into suspension again, they added blood serum, for example, of the cow, containing the same albumen solution.

The first step is carried out by precipitating the casein by very slightly acidifying the milk, skimmed milk or buttermilk, either diluted with water or not, by means of an acid with the addition of a small quantity of a decoction of carrageen, preferably a well filtered decoction, viscous at room temperature, containig 1 to 1,3 per cent of dry substance, as indicated by Dr. von Lingelsheim in the "Zeitschrift für Hygiene und Infectionskrankheiten", Bd. 42, 1903, page 309.

In this way the albumen of the milk is precipitated. By repeatedly washing with water and decanting, the precipitate may be freed from the remaining acid and all lactose.

The second step is carried out by adding a blood-serum—for example of the cow—diluted to the grade required for milk, so as to bring the albuminous residue into suspension again. The flavour and the state of suspension are improved by adding the salts occurring in the milk. When skimmed milk is used as the starting material, the requisite quantity of cream washed with water is added after the said operation.

*Example.*—The albumens contained in 1 litre of milk are precipitated by means of 10 cubic centimetres of a decoction of carrageen, containing 1–1,3 % of dry substance, the milk being previously acidified by means of an acid to a strength of 0,01 normal. The colloidal precipitate obtained in this way is washed with water until the washing-water is neutral and does not contain milk-sugar any longer. To the precipitate washed in said manner, 6 grams of a mixture of salts, composed of 16 grams of sodium chloride, 11 grams of magnesium chloride, 1 gram of ferric sulphate, 5 grams of potassium sulphate, 40 grams of secondary potassium phosphate and 2 grams of primary calcium phosphate, are added and after that, 60 cubic centimetres of bloodserum. Finally, water is added until the initial volume of 1 litre is obtained. These operations take place at room-temperature.

We claim:—

1. A process for the preparation of sugar free milk products which comprises bringing the milk products to be treated to a very slight acidity, causing the formation of a reversible colloidal precipitate, freeing the precipitate of the liquor and causing the precipitate to be dispersed in another liquid medium.

2. A process as in claim 1 wherein the dispersion of the precipitate is aided by the addition of blood serum to the second liquid medium.

3. A process as in claim 1 wherein the slightly acidic milk product is treated with a small amount of a decoction of carrageen.

4. A process as in claim 1 wherein a small amount of a decoction of carrageen is added to the slightly acidified milk product, and where a portion of blood serum is utilized to aid in dispersing the precipitate in the second liquid medium.

5. A process as in claim 1 wherein a mixture of salts equivalent to the salts in the natural milk product treated is added to the redispersed product.

6. A process for freeing milk products from sugars which comprises precipitating the suspended portion of said milk products by the use of a decoction of carrageen in the presence of a slight acidity, freeing said precipitate of liquor and dispersing said liquor free precipitate in water by the use of blood serum and adding to the second suspension salts equivalent to those present in the liquor of the original milk products.

7. A process as in claim 6 where the operation is conducted at room temperatures.

8. A process for producing a sugar free milk product which comprises adding a small amount of acid to a milk product, causing a precipitation by the addition of a portion of a decoction of carrageen, separating the precipitate from the liquid and dispersing said precipitate in water by the use of blood serum containing the same albumen solution as the original milk product.

9. A process as in claim 8 wherein salts equivalent to the salts present in the original milk product are added to the final dispersion.

In testimony whereof we affix our signatures.

DR. JACOB POHLMANN.
DR. JACOBUS RENARDUS FREDERIK RASSERS.